United States Patent [19]

Paker

[11] 4,189,904
[45] Feb. 26, 1980

[54] LEAF MULCHER ATTACHMENT FOR LAWN MOWERS

[76] Inventor: Alexander D. Paker, 3 S 335 Williams Rd., Warrenville, Ill. 60555

[21] Appl. No.: 690,398

[22] Filed: May 27, 1976

[51] Int. Cl.² ............................................. A01D 75/00
[52] U.S. Cl. ....................................... 56/255; 56/320.2
[58] Field of Search .................... 56/320.1, 320.2, 255, 56/202, 295, 12.8, 12.9, 13.3, 13.4, 16.9, 17.5, 503, 16.4, 500, 501, 502

[56] References Cited

U.S. PATENT DOCUMENTS

| | | | |
|---|---|---|---|
| 2,659,191 | 11/1953 | Miller et al. | 56/255 X |
| 2,836,024 | 5/1958 | Davis et al. | 56/255 X |
| 2,983,096 | 5/1961 | Phelps | 56/255 |
| 3,242,660 | 3/1966 | Gray | 56/255 X |
| 3,531,923 | 10/1970 | DeLay | 56/255 X |

*Primary Examiner*—Jay N. Eskovitz
*Attorney, Agent, or Firm*—George H. Gerstman

[57] ABSTRACT

A leaf mulching attachment is provided for connection to a conventional lawn mower. The attachment comprises a plate having inwardly extending tines and defining openings, with the plate being adapted for positioning in front of the grass ejection chute. The plate is connected to the housing of the lawn mower in a manner in which the plate and tines avoid contact with the normal grass cutting blade of the lawn mower, permitting the lawn mower to be used for cutting grass and mulching leaves without changing the cutting blade.

6 Claims, 5 Drawing Figures

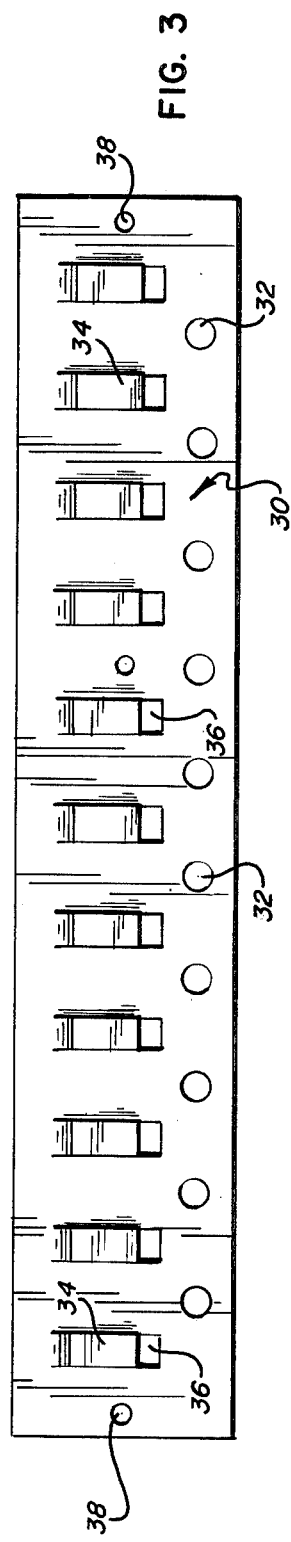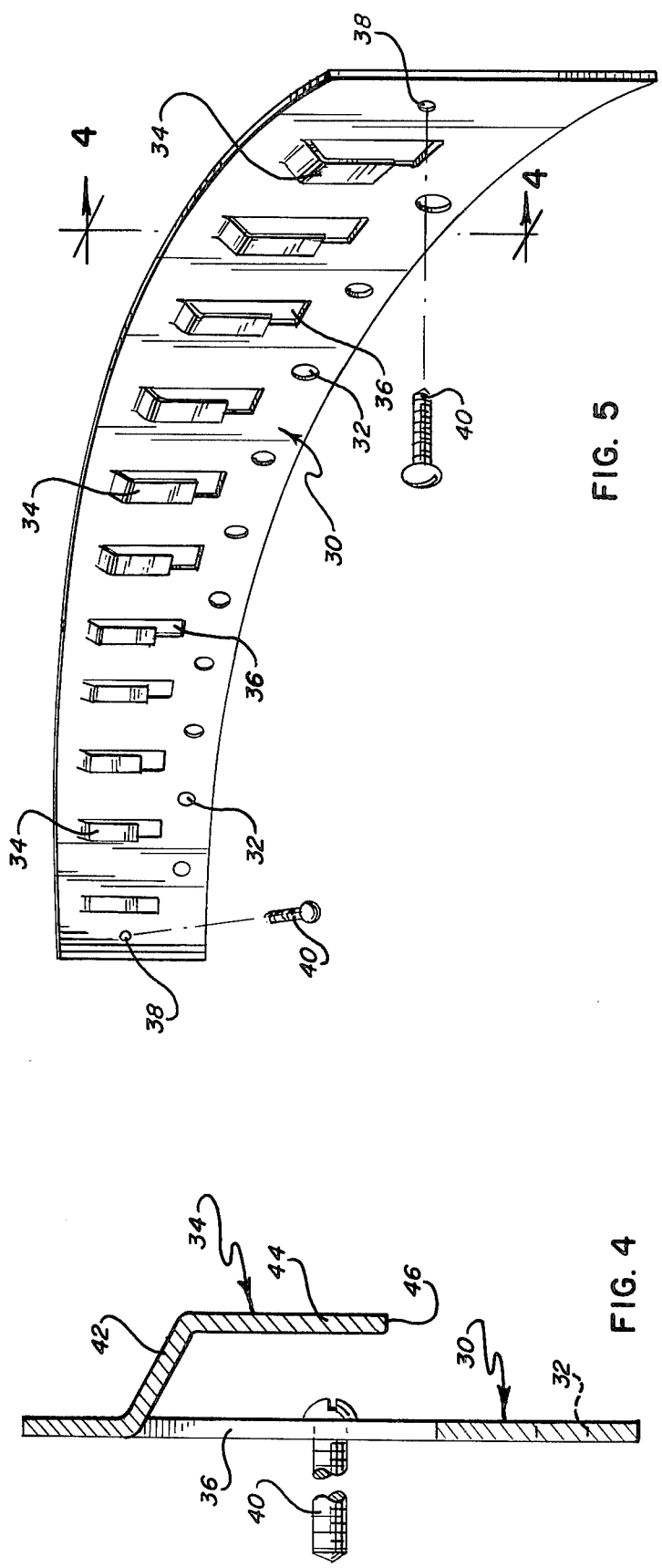

LEAF MULCHER ATTACHMENT FOR LAWN MOWERS

BACKGROUND OF THE INVENTION

This invention relates to a leaf mulching attachment for use with lawn mowers.

There are certain prior art leaf mulching systems which have various disadvantages. For example, Shaw U.S. Pat. No. 2,791,080 and Gary U.S. Pat. No. 3,134,212 disclose the use of screens in a rotary type lawn mower. These screens may clog, however, and are relatively difficult to install. Other systems, such as disclosed in Davis, et al. U.S. Pat. No. 2,836,024 and Miller, et al. U.S. Pat. No. 2,659,191 comprise complete leaf mulching systems which are integral with and are purchased with the lawn mower. Thus Davis, et al. and Miller, et al. do not disclose a type of system that is adaptable for use with a conventional lawn mower.

The U.S. Pat. to Gary, No. 3,242,660, discloses a leaf mulching attachment for lawn mowers, but the leaf mulching attachment disclosed therein also requires the use of a special leaf mulching blade substituted for the lawn cutting blade. In effect, the leaf mulching attachment disclosed in Gary U.S. Pat. No. 3,242,660 comprises a new cylindrical housing for the lawn mower, together with a new leaf mulching blade, both of which combine to form a relatively expensive system which is unable to handle grass cutting once installed. A combination lawn mowing and leaf mulching apparatus is disclosed in Pursel U.S. Pat. No. 3,797,212, but this apparatus is not adapted to fit conventional mowers and is relatively complicated. Further, a branch may jam the Purcel apparatus and damage the lawn mower blade.

It is, therefore, an object of the present invention to provide a leaf mulching apparatus which can be connected to conventional lawn mowers.

A further object of the present invention is to provide a leaf mulching attachment which is simple in construction, reliable in operation and easy to attach to conventional lawn mowers.

A still further object of the present invention is to provide a leaf mulching apparatus which can be attached to a conventional lawn mower and permits the normal lawn mowing blade to be used, in a manner whereby the device can be a combination lawn mower and leaf mulcher without requiring further alterations.

Another object of the present invention is to provide an attachment for a lawn mower which permits the lawn mower to both mow and mulch simultaneously.

Other objects and advantages of the present invention will become apparent as the description proceeds.

SUMMARY OF THE INVENTION

In accordance with the present invention, a leaf mulching attachment is provided for use with a conventional lawn mower. The attachment comprises a plate adapted for connection to the interior of the lawn mower's housing, with the plate having a size that is sufficient to cover a substantial portion of the lawn mower's grass ejection chute opening. A plurality of tines extend from the plate inwardly toward the axis of the lawn mower housing, and the plate defines a plurality of openings. Means are provided for connecting the plate to the lawn mower housing whereby the plate and tines avoid contact with the grass cutting blade.

In the illustrative embodiment, the tines are struck from the plate and extend inwardly and downwardly and overlie a portion of the openings from which the tines are struck. The connecting means comprises apertures for receiving threaded fasteners to connect the plate to the lawn mower housing.

A more detailed explanation of the invention is provided in the following description and claims, and is illustrated in the accompanying drawings.

BRIEF DESCRIPTION OF THE DRAWINGS

FIG. 3 is a front view of a leaf mulching attachment constructed in accordance with the principles of the present invention;

FIG. 4 is a perspective view of the leaf mulching attachment of FIG. 3; and

FIG. 5 is a cross-sectional view thereof, taken along the plane of the line 5—5 of FIG. 4.

DETAILED DESCRIPTION OF THE ILLUSTRATIVE EMBODIMENT

Figure 1:
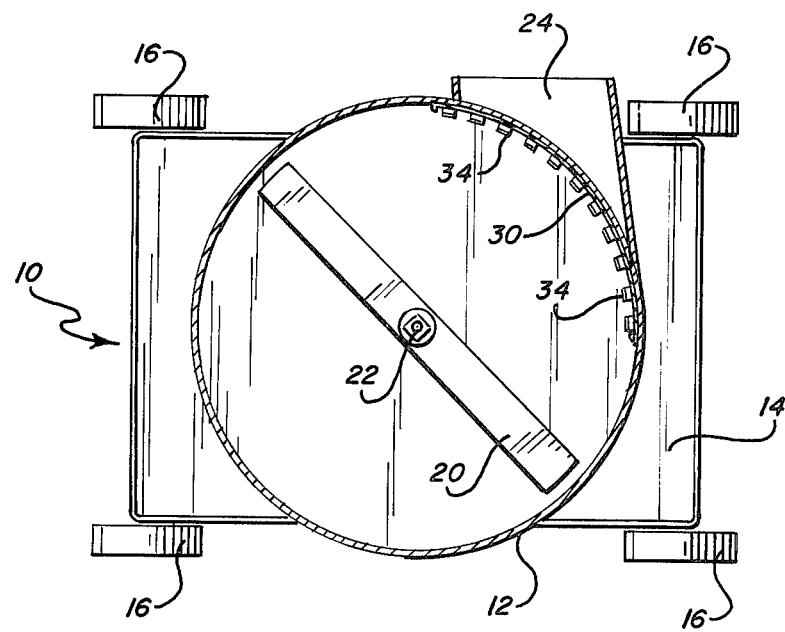
FIG. 1 is a bottom plan view of a lawn mower having connected to it a leaf mulching attachment constructed in accordance with the principles of the present invention.
Figure 2:
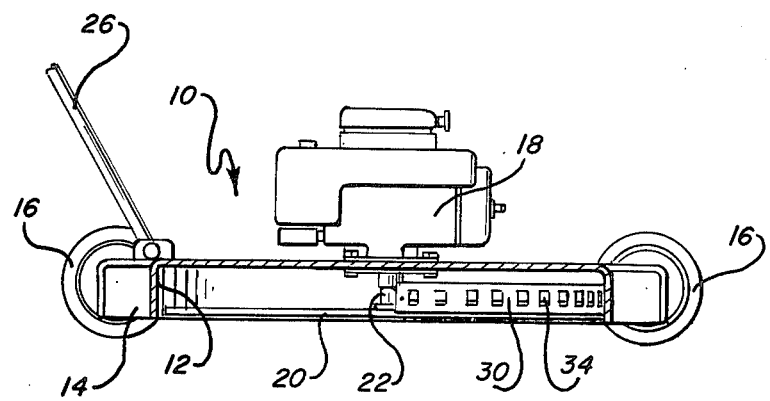
FIG. 2 is an elevational view thereof, taken partially in section to show clearly the leaf mulching attachment connected to the lawn mower housing.

Referring to FIGS. 1 and 2 in particular, a lawn mower 10 is shown therein having a housing 12 of generally circular cross-sectional configuration and a frame 14 supporting four wheels 16, in the conventional manner. A conventional lawn mower engine 18 is provided to drive a lawn mower blade 20 via shaft 22. Housing 12 defines a grass ejection chute 24 and frame 14 has a handle 26 connected thereto, all as is conventional in the art.

Now referring to all of the Figures, the leaf mulching attachment of the present invention comprises a plate 30, preferably formed of planar sheet steel defining circular openings 32, which circular openings are equally spaced in a lineal arrangement along plate 30. A number of tines 34 are struck from the plate and extend inwardly and downwardly to overlie a portion of the openings 36 from which the tines 34 are struck. A pair of oppositely positioned apertures 38 are defined by the plate 30, and are adapted for receiving threaded fasteners 40 for attaching plate 30 to the housing 12 of the lawn mower.

As shown most clearly in FIG. 5, each tine 34 has an inwardly extending portion 42 which extends inwardly at an approximately 20° angle with the horizontal and a downwardly extending portion 44 which extends substantially vertically downwardly.

Plate 30 is attached to a conventional lawn mower as follows. The gasoline is first drained from the lawn mower or the lawn mower is run to use up the gasoline. The spark plug wire is then removed. The lawn mower is then placed on its side with the exit chute upwardly, as illustrated in FIG. 1. Plate 30 is then bent to a curvilinear shape, to match the circumferential arc of the blade travel, as illustrated in FIGS. 1 and 4. The plate is positioned so that tines 34 extend inwardly towards the shaft 22 and in a downward direction (when the lawn mower is in its normal, standing position).

Apertures are drilled in the housing 12, using openings 38 as a template, to enable plate 30 to be connected to the housing and located in front of the opening of chute 24, as shown in FIG. 1. The horizontal plane of bottom 46 of each tine 34 should be above the highest horizontal plane of blade 20, preferably by approximately one-quarter inch, and the circumference of blade 20 should be spaced from portions 44 of tines 34 by approximately one-half inch. It is to be understood that these dimensions are specific examples which provide satisfactory operation, but no limitation with respect to such dimensions is intended or should be implied.

Further, other specific examples of dimensions which provide a satisfactory unit, it being understood that no limitations are intended, are as follows. The length of plate 30 is preferably 18 inches and its width is four inches. In the illustrative embodiment, eleven tines 36 are provided, and are spaced 1.55 inches from each other, with portion 42 extending one-half inch from plate 30 and opening 36 being one and one-half inches in length. Tines 34 and opening 36 are preferably one-half inch in width. Apertures 32 are preferably spaced 1.55 inches apart and have a $\frac{3}{8}$ inch diameter.

The leaf mulching attachment of the present invention effectively blocks the ejection chute and includes tines for mulching leaves and holes for filtering and air draft purposes. The plate is dimensioned so that the conventional lawn mower and lawn mower blade can be used while plate 30 is attached and the device can simultaneously mow and mulch.

The leaf mulching attachment of the present invention is effective to divert the normal flow of leaves so that the blade 20 can have more than one pass at the leaves. The tines 34 operate to mulch the leaves as the leaves are forced past them by the lifting force and natural ejection force of the mower housing. A secondary mulching effect is achieved by the leaves being forced through the openings 32 and 36, providing a combined action of the chute blocking plate 30 with the tines 34 and openings 32, 36 forcing the multiple blade action.

The leaf mulching attachment of the present invention can easily be connected to a conventional lawn mower, or multiblade riding mowers, is extremely simple in construction and can be made from a metal sheet, such as steel, or can be made of a molded material. The conventional lawn mower, with the plate 30 attached thereto, can mow and mulch simultaneously and the system is effective to mulch the leaves finely and distribute the leaves over the lawn surface in a manner to naturally fertilize the lawn.

Although an illustrative embodiment of the invention has been shown and described, it is to be understood that various modifications and substitutions may be made by those skilled in the art without departing from the novel spirit and scope of the present invention.

What is claimed is:

1. A leaf mulching attachment for use with a lawn mower of the type having a housing, a rotating grass cutting blade located within the housing and a grass ejection chute opening defined by the housing, the improvement comprising: a plate adapted for connection to the interior of said housing, said plate having a size that is sufficient to cover a substantial portion of said chute opening, a plurality of tines struck from said plate and extending from said plate inwardly toward said axis, said tines extending inwardly and downwardly and overlying a portion of the openings from which said tines are struck; said tines being located on said plate in a position adapted to lie in a horizontal plane above the highest horizontal plane of the grass cutting blade; said plate defining a plurality of openings; and means for connecting said plate to said housing whereby said plate and tines avoid contact with said grass cutting blade, said connecting means comprising apertures for receiving threaded fasteners.

2. A leaf mulching attachment for a lawn mower, which comprises: a plate defining a plurality of openings and a plurality of tines, said plate comprising a sheet adapted for positioning in front of the chute opening of the lawn mower, said plate being dimensioned for connection to the lawn mower housing without requiring removal of the lawn cutting blade normally carried by the lawn mower; and a plurality of tines extending inwardly and downwardly from the plate with each tine overlying at least a portion of an opening; and means for connecting said plate to the lawn mower and permitting said plate to avoid contact with said lawn cutting blade.

3. A leaf mulching attachment as described in claim 2, wherein said plate comprises a steel planar sheet adapted for curvilinear bending when connected to the housing of the lawn mower.

4. A leaf mulching attachment as described in claim 2, wherein said tines are struck from said plate and overlie a portion of the openings from which said tines are struck.

5. A leaf mulching attachment as described in claim 2, wherein said tines are located on said plate in a position adapted to lie in a horizontal plane above the highest horizontal plane of the grass cutting blade.

6. A leaf mulching attachment for use with a rotary lawn mower having a housing, a rotating grass cutting blade located within the housing and a grass ejection chute opening defined by the housing, the improvement comprising: a plate adapted for connection to the interior of said housing, said plate having a size that is sufficient to cover a substantial portion of said chute opening; a plurality of tines extending inwardly and downwardly from said plate; said plate defining a plurality of openings; and means for connecting said plate to said housing whereby said plate and tines avoid contact with said grass cutting blade; said tines being struck from said plate and overlying a portion of the openings from which said tines are struck.

* * * * *